United States Patent [19]
Ito et al.

[11] Patent Number: 5,597,956
[45] Date of Patent: Jan. 28, 1997

[54] CAPACITOR TYPE ACCELERATION SENSOR

[75] Inventors: Nobuhiro Ito; Tomio Shibano; Kaneo Yaji, all of Kyoto, Japan

[73] Assignee: Murata Manufacturing Co., Ltd., Japan

[21] Appl. No.: 516,933

[22] Filed: Aug. 18, 1995

[30] Foreign Application Priority Data

Aug. 24, 1994 [JP] Japan .................................. 6-222592

[51] Int. Cl.⁶ .......................... G01P 15/00; G01P 15/125
[52] U.S. Cl. ..................... 73/514.18; 73/514.32
[58] Field of Search ........................... 73/514.16, 514.17, 73/514.18, 514.32, 862.61, 862.337, 701, 718, 724; 324/661

[56] References Cited

U.S. PATENT DOCUMENTS

| | | | |
|---|---|---|---|
| 3,662,595 | 5/1972 | Hurlbert et al. | 73/862.61 |
| 5,311,140 | 5/1994 | Permuy | 73/765 |
| 5,325,065 | 6/1994 | Bennett et al. | 324/661 |
| 5,345,824 | 9/1994 | Sherman et al. | 73/514.18 |
| 5,465,604 | 11/1995 | Sherman | 73/514.18 |

FOREIGN PATENT DOCUMENTS

| | | |
|---|---|---|
| 3831593 | 3/1990 | Denmark . |
| 0459723 | 12/1991 | European Pat. Off. . |

OTHER PUBLICATIONS

European Search Report on European Patent Application No. EP-95-11 3187; Dec. 27, 1995.

*Primary Examiner*—Hezron E. Williams
*Assistant Examiner*—Richard A. Moller
*Attorney, Agent, or Firm*—Ostrolenk, Faber, Gerb & Soffen, LLP

[57] ABSTRACT

A capacitor type acceleration sensor is disclosed. In this sensor, an acceleration sensing element 1 has two variable capacitors C1 and C2 that are constructed with a couple of fixed electrodes and a movable electrode located between the fixed electrodes. Electrostatic power generation/feedback means 15 applies to the fixed- and movable-electrode pairs such an electrostatic power as to set the movable electrode at a preset reference position in accordance with the output signal of capacitance-difference detector means 10. The electrostatic power is outputted as an output signal of the capacitor type acceleration sensor. In the capacitor type acceleration sensor, another fixed capacitor Cx of which the capacitance value Cx is larger than the maximum capacitance-difference between the variable capacitors C1 and C2 of which the capacitance values vary in accordance with an acceleration, is connected in parallel with the variable capacitor C2. The capacitance (C2+Cx) is larger than the capacitance of the variable capacitor C1, irrespective of the direction of acceleration.

4 Claims, 4 Drawing Sheets

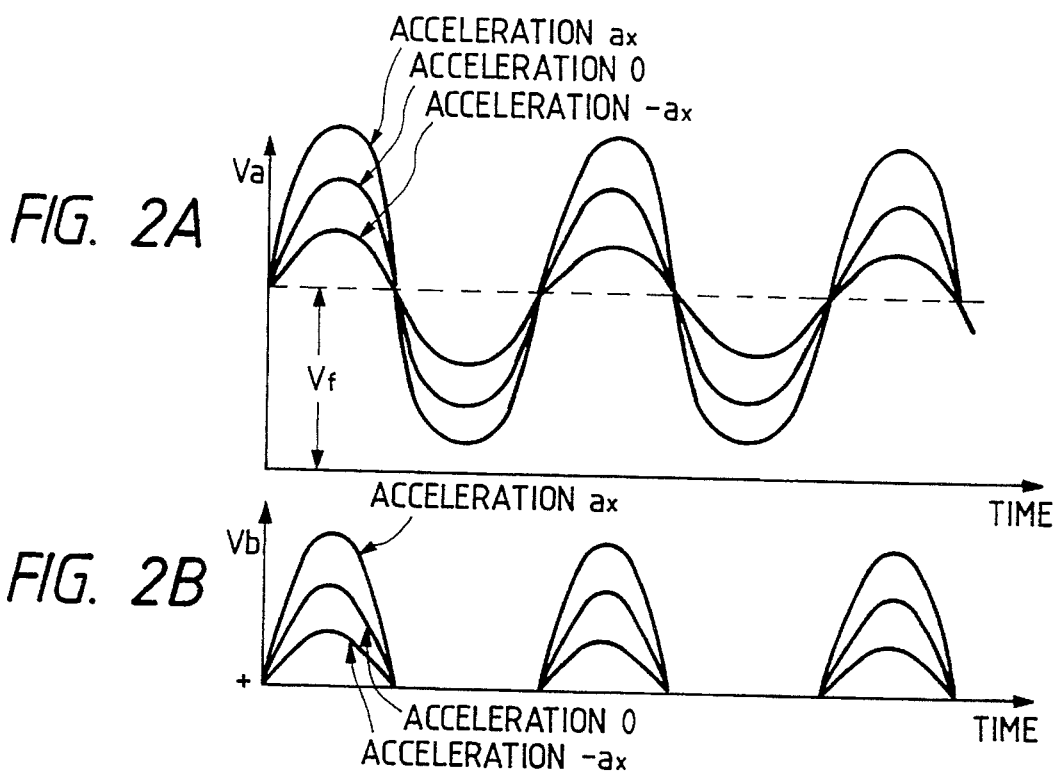
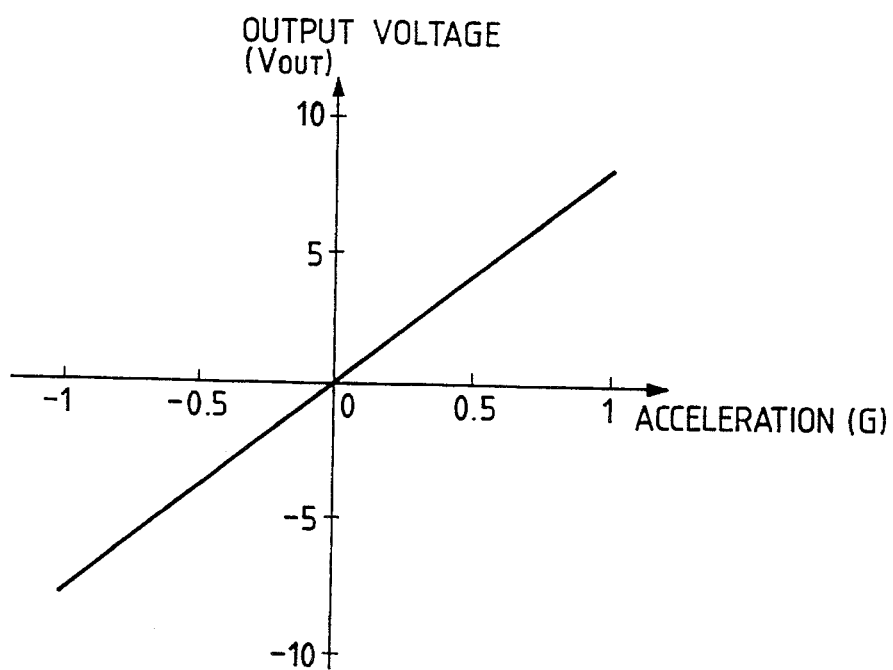

CAPACITOR TYPE ACCELERATION SENSOR

BACKGROUND OF THE INVENTION

1. Field of the Invention

The present invention relates to a capacitor type acceleration sensor based on the electrostatic servo system for sensing an acceleration by making use of a variation of capacitance of a capacitor.

2. Discussion of the Related Art

A capacitor type acceleration sensor based on the electrostatic servo system is a typical example of the acceleration sensor. The capacitor type acceleration sensor is fabricated by a silicon microfabrication technique. The capacitor type acceleration sensor has a broad dynamic range and a high sensitivity. Because of advantageous features, the acceleration sensor has the attraction of designers in this field.

FIG. 4 is a block diagram showing the circuit arrangement of a conventional capacitor type acceleration sensor based on the electrostatic servo system. The mechanical construction of an acceleration sensing element 1 used in the acceleration sensor of FIG. 4, is schematically illustrated in FIG. 7. As shown, a movable electrode 4 is disposed at the mid position (neutral position) between fixed electrodes 2 and 3. The movable electrode 4 is supported at both ends thereof by a couple of cantilevers 5 in such a way when receiving an acceleration, the movable electrode 4 is displaced in the Y directions. Returning to FIG. 4, a variable capacitor C1 is constructed with the fixed electrode 2 and the movable electrode 4, and another variable capacitor C2 is constructed with the fixed electrode 3 and the movable electrode 4. The variable capacitors C1 and C2 are fabricated by the silicon microfabrication technique.

A sinusoidal wave signal of an amplitude Vp and at an angular frequency ω, generated by an oscillator 6, is applied to the variable capacitor C2 of the acceleration sensing element 1. A phase invertor 9 is inserted between the oscillator 6 and the variable capacitor C1. The sinusoidal wave signal, generated by the oscillator 6, is phase shifted by 180° by the phase invertor 9, and applied to the variable capacitor C1. The amplitude and the angular frequency of the sinusoidal wave signal inverted and applied to the variable capacitor C1 are also Vp and ω. The acceleration sensing element 1 is connected at the output terminal to a capacitance-difference detector circuit 10, which functions as a capacitance-difference detecting means for detecting a capacitance difference between the variable capacitors C1 and C2, and outputs in the form of power signal. The capacitance-difference detector circuit 10 includes an operational amplifier A1. The output terminal of the acceleration sensing element 1 is connected to the inverting input terminal of the operational amplifier A1. The noninverting input terminal of the operational amplifier A1 is earthed. A feedback resistor Rf is inserted between the inverting input terminal and the output terminal of the operational amplifier A1.

As shown in FIG. 4, a synchronous detector circuit 12 is inserted between the oscillator 6 and the capacitance-difference detector circuit 10. An electrostatic power generation/feedback means 15 is inserted between the output terminal of the capacitance-difference detector circuit 10 and the acceleration sensing element 1. The electrostatic power generation/feedback means 15 applies an electrostatic power to the fixed- and movable-electrode pairs 2 and 4, and 3 and 4. The electrostatic power sets the movable electrode 4 at a preset reference position (the neutral position) in accordance with the output signal of the capacitance-difference detector circuit 10. The electrostatic power generation/feedback means 15 includes an integrator 11, a comparator 13, and a feedback ratio setting circuit 14. The integrator 11 detects an output voltage of the capacitance-difference detector circuit 10, integrates it, and outputs the result of the integration to the comparator 13.

The comparator 13 compares the output voltage signal of the capacitance-difference detector circuit 10 with a reference voltage. More specifically, the output voltage signal of the capacitance-difference detector circuit 10 is integrated by the integrator 11. The output voltage signal of the integrator 11 and a reference voltage are compared by the comparator 13. The reference voltage is equal to the integrated value (offset) of the output voltage of the capacitance-difference detector circuit 10 when the acceleration is zero. That is, it is zero. The feedback ratio setting circuit 14 applies the output signal of the comparator 13 as a servo feedback voltage to the fixed- and movable-electrode pairs 2 and 4, and 3 and 4. Since the feedback voltage is set on the basis of a state that the acceleration is zero, the movable electrode 4 of the acceleration sensing element 1 is controlled so as to be at the position thereof when the acceleration is zero. Accordingly, the output voltage of the capacitor type acceleration sensor when the acceleration is zero is the feedback voltage itself.

As recalled, the sinusoidal wave signals which are respectively applied to the fixed electrodes 2 and 3 are out of phase, but are equal in the amplitude Vp and the angular frequency ω. An amplitude $V_A$ of the output voltage $V_{OUT1}$ of the capacitance-difference detector circuit 10, which receives the output signal from the acceleration sensing element 1 receiving such sinusoidal wave signals, is mathematically expressed by the following equation (1). A waveform of the output voltage $V_{OUT1}$ is as shown in FIG. 6.

$$V_A = -Rf \cdot Vp \cdot \omega \cdot (C2 - C1) \tag{1}$$

In the capacitor type acceleration sensor thus constructed, when no acceleration acts on the acceleration sensing element 1, the movable electrode 4 is set at the mid position between the fixed electrodes 2 and 3. At this position, the capacitance values of the variable capacitors C1 and the C2 are equal to each other. The amplitude $V_A$ of the output voltage $V_{OUT1}$ is zero as seen from the equation (1). The operational amplifier A1 of the capacitance-difference detector circuit 10 produces voltage of zero as a capacitance-difference detect signal. When an acceleration acts on the acceleration sensing element 1 in a direction, the capacitance values of the variable capacitors C1 and C2 vary, so that the amplitude $V_A$ takes a value dependent on the capacitance-difference between the variable capacitors C1 and C2. The output voltage $V_{OUT1}$ of the capacitance-difference detector circuit 10 also vary dependent on the capacitance-difference between the variable capacitors C1 and C2. When C1>C2, the output voltage $V_{OUT1}$ varies along a waveform as indicated by a solid line in FIG. 6. When C1<C2, viz., an acceleration acts on the acceleration sensing element 1 in the direction that is opposite to that of the electrostatic power in the previous case, the capacitance-difference detect voltage $V_{OUT1}$ varies along a waveform as indicated by a dotted line. In this case, it is phased shifted 180° from the output voltage in the previous case.

The direction of the acceleration can be judged by synchronizing the sinusoidal wave signal from the oscillator 6 with the capacitance-difference detect voltage $V_{OUT1}$ of the capacitance-difference detector circuit 10 by the synchronous detector circuit 12. When the output voltage of the capacitance-difference detector circuit 10 is applied to the electrostatic power generation/feedback means 15, the electrostatic power generation/feedback means 15 produces the servo feedback voltage that depends on the output voltage of the capacitance-difference detector circuit 10. This servo feedback voltage is outputted as the output voltage of the acceleration sensor. At the same time, an electrostatic power to reduce the capacitance of the variable capacitor C1 is applied to the fixed- and movable-electrode pairs 2 and 4, and 3 and 4, when C1>C2. When C1<C2, an electrostatic power of which the direction is opposite to that of the electrostatic power applied when C1>C2 is applied to the fixed- and movable-electrode pairs 2 and 4, and 3 and 4. In this way, the movable electrode 4 is set at the reference position (neutral position).

To set the offset of the capacitance-difference detect signal at 0 (zero) when the acceleration is 0, it is necessary to adjust the variable capacitors C1 and C2 so as to have exactly equal capacitance values under the condition that the acceleration is 0. Actually, a product variation is inevitable for the manufactured acceleration sensing elements 1. This makes it difficult to adjust capacitance values of the variable capacitors C1 and C2 so as to be exactly equal to each other. As shown in FIG. 6, the phase of the capacitance-difference detect signal is inverted depending on the direction of the acceleration. Because of this, a small capacitance detecting region is within the phase inverted region. As a result, the linearity of the capacitance-difference detect signal is poor in the vicinity of the 0 point, and the resolution of the capacitor type acceleration sensor is low.

The capacitance-difference detect voltage whose phase is inverted depending on the direction of the acceleration, varies with time. In this case, the variation of this voltage takes a sinusoidal waveform varying with respect to the zero voltage, irrespective of the direction of the acceleration. In other words, the capacitance-difference detect voltage is an AC voltage of a sinusoidal waveform. To detect the direction of the acceleration, a synchronous detector circuit is required. Use of the synchronous detector circuit makes the circuit construction complicated, and increases the sensor cost.

SUMMARY OF THE INVENTION

With the view of solving the above problems, the present invention has an object to provide a capacitor type acceleration sensor which is simple in circuit construction and high in resolution, not using the synchronous detector circuit.

To achieve the above object, there is provided a capacitor type acceleration sensor based on the electrostatic servo system having an acceleration sensing element having two variable capacitors that are constructed with a couple of fixed electrodes and a movable electrode that is located between the fixed electrodes and movable in response to an acceleration, capacitance-difference detector means for detecting a capacitance difference between the two variable capacitors and for producing the detected capacitance difference in the form of a voltage, and electrostatic power generation/feedback means for applying an electrostatic power to the fixed- and movable-electrode pairs in order to set the movable electrode at a preset reference position in accordance with the output signal of capacitance-difference detector means, the capacitor type acceleration sensor being characterized in that another fixed capacitor of which the capacitance value is larger than the maximum capacitance-difference between the variable capacitors of which the capacitance values vary in accordance with an acceleration, is connected across either of the variable capacitors.

In the capacitor type acceleration sensor, the electrostatic power generation/feedback means includes a comparator for comparing the integrated value of the output voltage of the capacitance-difference detector means with the reference voltage, and further reference voltage adjusting means for adjusting the reference voltage to be equal to the integrated value of the voltage that is produced from the capacitance-difference detector means when an acceleration is zero.

In the capacitor type acceleration sensor of the present invention, the additional fixed capacitor of which the capacitance value is larger than the maximum capacitance-difference between the variable capacitors of which 1 the capacitance values vary in accordance with an acceleration, is connected across either of the variable capacitors. Therefore, the capacitance of the variable capacitor coupled with the additional fixed capacitor is larger than that of the variable capacitor not coupled with the additional fixed capacitor, irrespective of the direction of acceleration. Accordingly, the phase of the output voltage of the capacitance-difference detector means is fixed, not inverted. The output signal of the capacitance-difference detector means is monotonously increased or decreased over the entire dynamic range of acceleration. The linearity of the capacitance-difference detect signal is good in the vicinity of a point where the acceleration is zero, and the resolution of the capacitor type acceleration sensor is high.

The nature, utility and principle of the invention will be more clearly understood from the following detailed description and the appended claims when read in conjunction with the accompanying drawings.

BRIEF DESCRIPTION OF THE DRAWINGS

FIGS. 2A and 2B are diagrams showing waveforms of the capacitance-difference detect voltage signals Va and Vb outputted from a capacitance-difference detector circuit used in the capacitor type acceleration sensor of FIG. 1;

FIG. 3 are graphs showing a variation of the output voltage $V_{OUT}$ of the capacitor type acceleration sensor with respect to an acceleration;

DETAILED DESCRIPTION OF THE PREFERRED EMBODIMENTS

Figure 1:
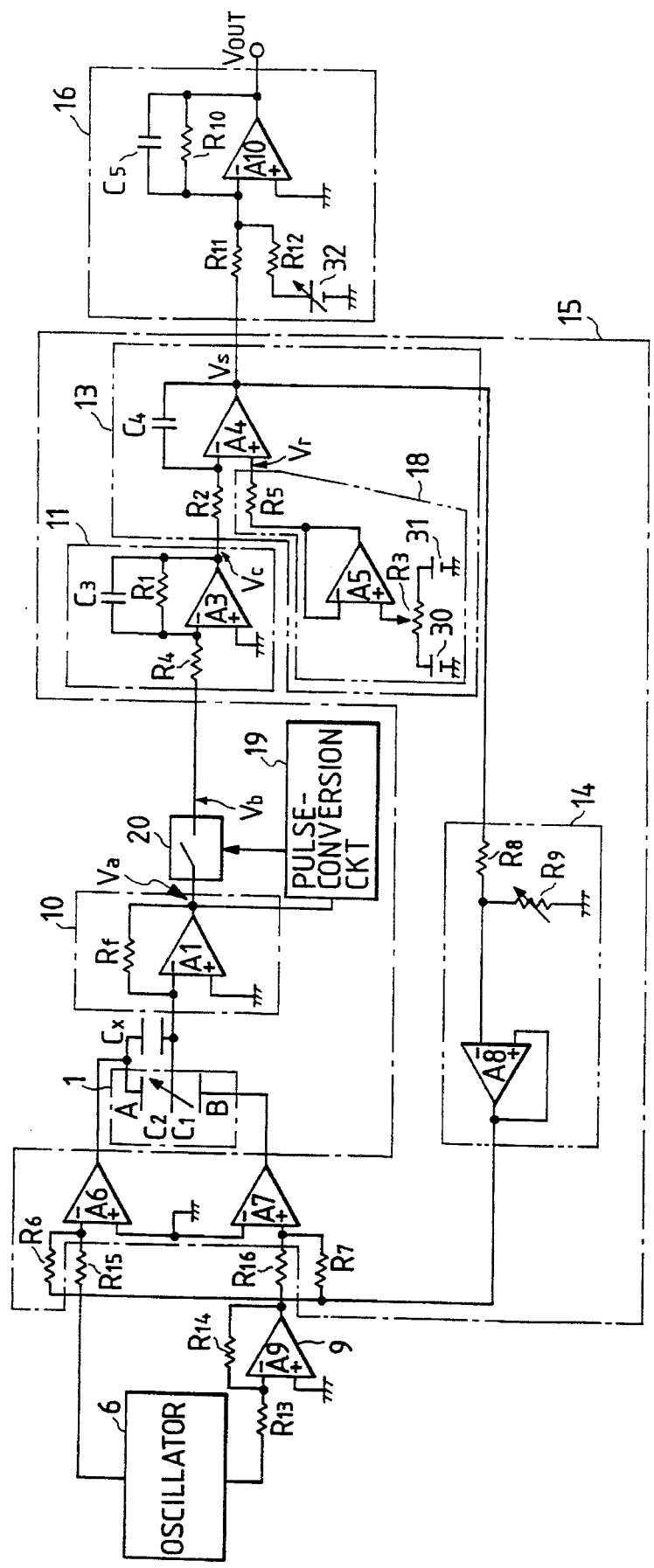
FIG. 1 is a circuit diagram showing an embodiment of a capacitor type acceleration sensor according to the present invention.
Figure 4:
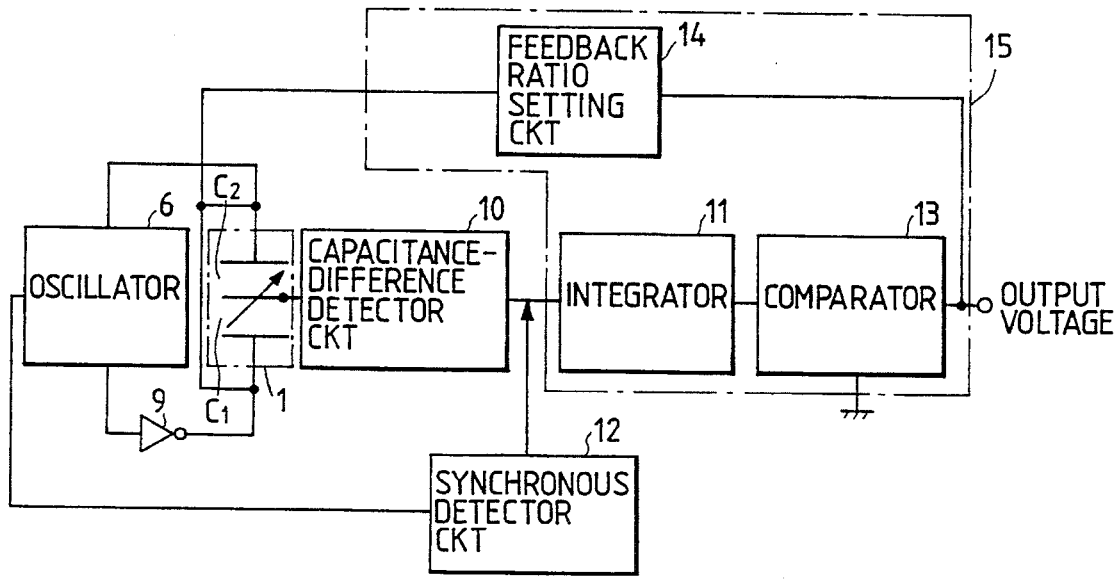
FIG. 4 is a block diagram showing the circuit arrangement of a conventional capacitor type acceleration sensor based on the electrostatic servo system.
Figure 5:
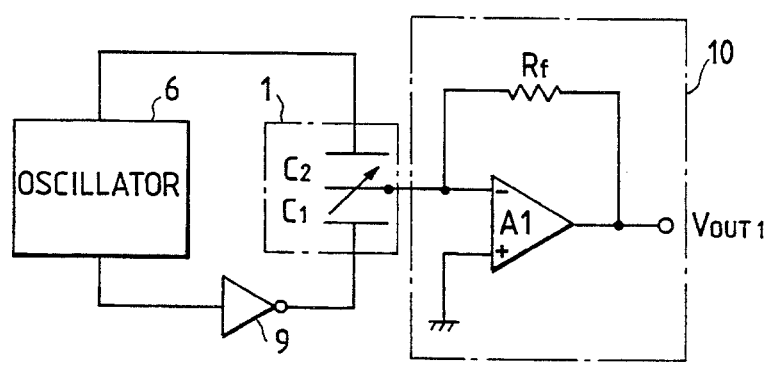
FIG. 5 is a block diagram showing a capacitance-difference detector circuit used in the capacitor type acceleration sensor of FIG. 4.
Figure 6:
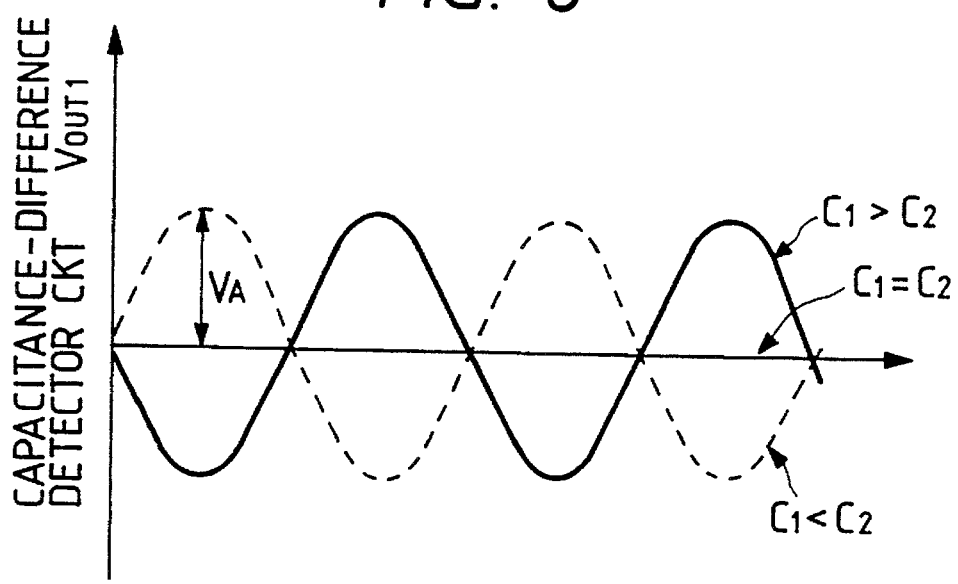
FIG. 6 is a diagram showing waveforms of the capacitance-difference detect voltage signals outputted from the capacitance-difference detector circuit of FIG. 5.
Figure 7:
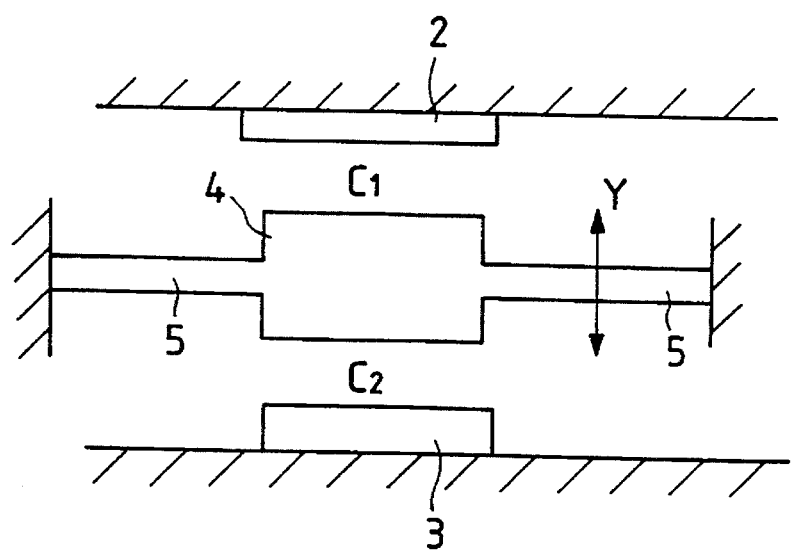
FIG. 7 is a view schematically showing a mechanical construction of an acceleration sensing element used in the capacitor type acceleration sensor of FIG. 4.

A preferred embodiment of the present invention will be described with reference to the accompanying drawings. Throughout the drawings to be referred to, like or equivalent portions will be designated by like reference numerals used in the figures referred to in the prior art description. Therefore, the description of them will be omitted.

FIG. 1 is a circuit diagram showing an embodiment of a capacitor type acceleration sensor according to the present invention. The capacitor type acceleration sensor of the present embodiment, like the conventional one, includes an acceleration sensing element 1, a capacitance-difference detector circuit 10, and a electrostatic power generation/feedback circuit 15. The capacitor type acceleration sensor of the embodiment is different from the conventional one in that a fixed capacitor Cx and reference voltage adjusting circuit means 18 are additionally provided. The fixed capacitor Cx is connected in parallel with the variable capacitor C2 of the acceleration sensing element 1. A capacitance value of the fixed capacitor Cx is larger than the maximum capacitance-difference between the variable capacitors C1 and C2 of which the capacitance values vary in accordance with an acceleration. The reference voltage adjusting circuit 18 adjusts the reference voltage, which is to be inputted to the noninverting input terminal of the comparator 13 in the electrostatic power generation/feedback means 15, to be equal to the integrated value of the voltage that is produced from the capacitance-difference detector circuit 10 when an acceleration is zero.

The capacitance values of the variable capacitors C1 and C2 in the acceleration sensing element 1 are selected as: C1≈C2. The capacitance of the fixed capacitor Cx, which is connected in parallel with the variable capacitor C2, is larger than the maximum capacitance difference between the variable capacitors C1 and C2 over the dynamic range Of acceleration. The relation (C2+Cx)>C1 holds. Accordingly, the impedance of (C2+Cx) is always smaller than that of C1.

The output terminal of the acceleration sensing element 1 containing the fixed capacitor Cx is connected to the capacitance-difference detector circuit 10. The output terminal of the capacitance-difference detector circuit 10 is connected to a pulse-conversion circuit 19 and an analog switch 20. An electrostatic power generation/feedback circuit 15 is connected to the output terminal of the analog switch 20 and the input terminal of the acceleration sensing element 1.

The electrostatic power generation/feedback circuit 15 includes an integrator 11, a comparator 13, and a feedback ratio setting circuit (feedback ratio adjustor) 14. The integrator 11 includes an operational amplifier A3, a resistor R1, and a capacitor C3. The noninverting input terminal of the operational amplifier A3 is grounded. The resistor R1 and the capacitor C3, connected in parallel, are inserted between the inverting input terminal and the output terminal of the operational amplifier A3. The comparator 13 is connected to the output terminal of the operational amplifier A3.

The comparator 13 includes an operational amplifier A4, a capacitor C4, a resistor R2, and the reference voltage adjusting circuit 18. The resistor R2 is connected to the inverting input terminal of the operational amplifier A4. The capacitor C4 is inserted between the inverting input terminal of the operational amplifier A4 and the output terminal thereof. The feedback ratio setting circuit 14 and an integrator/adder 16 are connected to the output terminal of the operational amplifier A4. The reference voltage adjusting circuit 18 is connected to the noninverting input terminal of the operational amplifier A4.

The reference voltage adjusting means 18 includes an operational amplifier A5, a variable resistor R3 of the slider type, and a couple of power sources 30 and 31. The noninverting input terminal of the operational amplifier A5 is connected through the variable resistor R3 to the power sources 30 and 31. The output terminal and the inverting input terminal of the operational amplifier A5 are connected to the noninverting input terminal of the operational amplifier A4, through a resistor R5. In the thus constructed reference voltage adjusting circuit 18, the integrated value Vr of the reference voltage inputted to the operational amplifier A4 is adjusted by slidably operating the variable resistor R3.

The feedback ratio setting circuit 14 includes an operational amplifier A8, a resistor R8, and a variable resistor R9. The inverting input terminal of the operational amplifier A8 is connected to the output terminal of the comparator 13 (more exactly the output terminal of the operational amplifier A4, through the resistor R8, and further to the variable resistor R9). The noninverting input terminal and the output terminal of the operational amplifier A8 are interconnected. The output terminal of the operational amplifier A8 is connected through the resistor R7 to the inverting input terminal of an operational amplifier A7, and through a resistor R6 to the inverting input terminal of an operational amplifier A6. These operational amplifiers A6 and A7 serve as servo adders.

The output terminal of the operational amplifier A6 is connected to the capacitor C3 (denoted as A in the figure) of the variable capacitor C2 and the fixed capacitor Cx. The output terminal of the operational amplifier A7 is connected to the fixed electrode 2 (denoted as B in the figure) of the variable capacitor C1. The noninverting input terminals of the operational amplifiers A6 and A7 are both earthed.

The integrator/adder 16 includes an operational amplifier A10, a parallel circuit of a capacitor C5 and a resistor R10, resistors R11 and R12, and a variable power source 32. As shown, the inverting input terminal of the operational amplifier A10 is connected to the output terminal of the operational amplifier A4, through the resistor R11, and further to the resistor R12 and the variable power source 32. The noninverting input terminal of the operational amplifier A10 is earthed. The parallel circuit of the capacitor C5 and the resistor R10 is inserted between the inverting input terminal and the output terminal of the operational amplifier A10.

The phase invertor 9 includes an operational amplifier A9. The noninverting input terminal of the operational amplifier A9 is earthed. The inverting input terminal of the operational amplifier A9 is connected through a resistor R13 to an oscillator 6. A resistor R14 is inserted between the output terminal and the inverting input terminal of the operational amplifier A9. The output terminal of the operational amplifier A9 is connected through a resistor R16 to the inverting input terminal of the operational amplifier A7. The oscillator 6 is connected to the inverting input terminal of the operational amplifier A6, through a resistor R15.

The operation of the thus constructed capacitor type acceleration sensor of the present embodiment will be described. Also in the capacitor type acceleration sensor, a sinusoidal wave signal of an amplitude Vp and at an angular frequency ω, generated by an oscillator 6, is applied to the variable capacitor C2 of the acceleration sensing element 1, through the operational amplifier A6. The sinusoidal wave signal, generated by the oscillator 6, is phase shifted 180° by the phase invertor 9, and applied to the variable capacitor C1. The amplitude and the angular frequency of the sinusoidal wave signal inverted and applied to the variable capacitor C1 are also Vp and ω. In the present embodiment, since the fixed capacitor Cx is connected in parallel with the variable capacitor C2, the amplitude V1 of the output voltage Va from the capacitance-difference detector circuit 10 is as given by the following equation (2)

$$V1 = -Rf \cdot Vp \cdot \omega \cdot Cx - Rf \cdot Vp \cdot \omega \cdot (C2-C1) \quad (2)$$

where Rf represents resistance of the feedback resistor Rf of the operational amplifier A1, and ω (angular frequency)= 2πf.

The output voltage Va of the capacitance-difference detector circuit 10 has an offset voltage of $-Rf \cdot Vp \cdot \omega \cdot Cx$, and has a linear relationship with the capacitance-difference (C2–C1) between the variable capacitors C1 and C2.

The equation (2) can be rearranged into the following equation (3).

$$V1 = -Rf \cdot Vp \cdot \omega \cdot (Cx - (C2-C1)) \quad (3)$$

As seen from the equation (3), the amplitude V1 of the output voltage Va is proportional to a capacitance-difference (Cx–(C2–C1)), which is the capacitance difference between the capacitance Cx of the fixed capacitor Cx and the capacitance-difference (C2–C1) between the variable capacitors C1 and C2.

As already referred to, the capacitance Cx of the fixed capacitor Cx is selected to be larger than the maximum value of the capacitance-difference (C2–C1). Accordingly, the capacitance Cx is always larger than the capacitance-difference (C2–C1). And the capacitance-difference (Cx–(C2–C1)) is positive irrespective of the direction of acceleration. The phase of it is not inverted when the direction of acceleration is changed. Thus, the output voltage Va of the capacitance-difference detector circuit 10 is a sinusoidal AC voltage whose phase will not be inverted. The output voltage Va as the capacitance-difference detect signal has an offset voltage even when the acceleration is zero, as shown in FIG. 2A. When an acceleration ax acts on the acceleration sensing element 1, and the capacitance C2 of the variable capacitor C2 becomes larger than the capacitance C1 of the variable capacitor C1, viz., C2>C1, the amplitude V1 of the output voltage Va increases above the amplitude V1 when the acceleration is zero. When an acceleration of –ax acts, and C1>C2 holds, the amplitude V1 of the output voltage Va becomes smaller than the amplitude V1 when the acceleration is zero. The sinusoidal waveform of the output voltage Va varies with respect to a positive constant voltage Vf, while the sinusoidal waveform of the AC voltage of the conventional capacitor type acceleration sensor varies with respect to zero voltage. Accordingly, the waveform of the output voltage Va never crosses the zero voltage level.

Each of these AC voltages outputted from the capacitance-difference detector circuit 10 is half-wave rectified by a pulse-conversion circuit 19 and an analog switch 20, into a voltage signal Vb as shown in FIG. 2B.

As shown in FIG. 1, the signal Vb is integrated by the integrator 11 into a DC voltage Vc. The DC voltage Vc is applied through the input resistor R2 to the inverting input terminal of the operational amplifier A4. At this time, the reference voltage Vr is adjusted so as to be equal to the integrated value of the output voltage of the capacitance-difference detector circuit 10 when the acceleration is zero, and is inputted to the noninverting input terminal of the operational amplifier A4, from the reference voltage adjusting means 18. The operational amplifier A4 compares the reference voltage Vr with the integrated value of the capacitance-difference detect signal that is detected by the capacitance-difference detector circuit 10. A difference between the integrated value of the capacitance-difference detect signal and the integrated value of the offset voltage is outputted as a servo voltage Vs. The servo voltage Vs is fed back to the operational amplifiers A6 and A7, and to the fixed electrode 3 and 2 of the capacitors C3 and C2, through the feedback ratio setting circuit (feedback ratio adjustor) 14.

The servo voltage Vs is also applied to the integrator/adder 16 where noise components of the servo voltage Vs, are removed. The noise components are offset voltages of the operational amplifiers A1 to A4, for example. The servo voltage Vs, after the removal of its noise components, is outputted as an output voltage $V_{OUT}$. The output voltage $V_{OUT}$ linearly varies with respect to the acceleration as shown in FIG. 3. The result of measuring an acceleration within ±1G by using the capacitor type acceleration sensor of the present embodiment is plotted in FIG. 3.

Thus, in the capacitor type acceleration sensor of the present invention, the phase of the capacitance-difference detect signal outputted from the capacitance-difference detector circuit 10 is fixed, not inverted, irrespective of the direction of the acceleration. The capacitance-difference detect signal is monotonously increased or decreased over the entire dynamic range of acceleration. As already described, in the conventional capacitor type acceleration sensor, the phase of the capacitance-difference detect signal is inverted depending on the direction of the acceleration. Because of this, a small capacitance detecting region is within the phase inverted region. As a result, the linearity of the capacitance-difference detect signal is poor in the vicinity of the 0 point, and the resolution of the capacitor type acceleration sensor is low. The present invention successfully solves the problem of the conventional capacitor type acceleration sensor. The linearity of the capacitance-difference detect signal is good in the vicinity of the 0 point, and the resolution of the capacitor type acceleration sensor is high. Further, in the capacitor type acceleration sensor of the present invention, there is no need of using the synchronous detector circuit for detecting the direction of the acceleration. In this respect, the capacitor type acceleration sensor is simplified in the circuit construction, and hence the sensor cost is reduced.

As described above, in the capacitor type acceleration sensor of the present invention, the offset voltage of the capacitance-difference detect signal when the acceleration is zero is not reduced to zero. The offset voltage other than zero is present also when the acceleration is zero. The integrated value of the offset voltage is adjusted by the reference voltage adjusting circuit 18, whereby the movable electrode 4 is set at the reference position. For this reason, the present invention eliminates the troublesome work to adjust the variable capacitors C1 and C2 so as to have exactly equal capacitance values, the work being essential to the conventional capacitor type acceleration sensor. Accordingly, the capacitor type acceleration sensor of the present invention is able to exactly sense an acceleration even if it suffers from the product variation.

It is to be understood that the above-mentioned embodiment of the present invention may variously be changed, modified and altered within the scope of the invention. For example, the fixed capacitor Cx may be connected in parallel with the variable capacitor C1, while it is connected in parallel with the variable capacitor C2 in the embodiment.

The integrator/adder 16 for removing the noise components of the operational amplifiers A1 to A4, which is connected to the output of the capacitor type acceleration sensor, may be removed if required.

In the embodiment, the integrated value Vr to be inputted to the operational amplifier A4 of the comparator 13 is adjusted by the reference voltage adjusting circuit 18 that is connected to the noninverting input terminal of the operational amplifier A4. The reference voltage adjusting circuit 18 may be substituted by a power source which produces a fixed reference voltage. In this case, the offset voltage signal is contained in the output signal of the comparator 13. However, it can be removed by using a circuit for removing the offset voltage signal at a proper location in the circuit.

In the capacitor type acceleration sensor of the present invention, the additional fixed capacitor of which the capacitance value is larger than the maximum capacitance-difference between the variable capacitors of which the capacitance values vary in accordance with an acceleration, is connected in parallel with either of the variable capacitors. Accordingly, the phase of the output voltage of the capacitance-difference detector means is not inverted depending on the direction of acceleration. The magnitude and the direction of the acceleration can easily be known from the output signal of the capacitance-difference detector means. The linearity of the capacitance-difference detect signal is good even in the small acceleration detecting region, and the resolution (detect accuracy and a detect sensitivity) of the capacitor type acceleration sensor is high. There is no need of using the synchronous detector circuit for detecting the direction of the acceleration, so that the capacitor type acceleration sensor is simplified in the circuit construction, and hence the sensor cost is reduced.

The capacitor type acceleration sensor includes reference voltage adjusting means for adjusting the reference voltage that is to be inputted to the comparator of the electrostatic power generation/feedback means, to be equal to the integrated value of the voltage that is produced from the capacitance-difference detector means when an acceleration is zero. The reference voltage is adjusted by the reference voltage adjusting means, so that an electrostatic power for setting the movable electrode at a preset standard position is adjusted. In the conventional capacitor type acceleration sensor, the reference voltage to be inputted to the comparator is reduced to zero, and to this end, the capacitance values of the two variable capacitors must be adjusted to exactly be equal to each other. The capacitor type acceleration sensor of the present invention is free from such troublesome work. The capacitor type acceleration sensor of the invention is able to exactly sense an acceleration even if the capacitance values of the two variable capacitors are deviated from the designed ones. This fact makes it easy to manufacture the acceleration sensing element of the capacitor type acceleration sensor.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A capacitor type acceleration sensor of an electrostatic servo system, comprising:

an acceleration sensing element having two variable capacitors which include a couple of fixed electrodes and a movable electrode that is located between said fixed electrodes and movable in response to an acceleration;

capacitance-difference detector for detecting a difference in the capacitance between said two variable capacitors and for producing a voltage indicative of the detected capacitance difference;

electrostatic power generation/feedback circuit for applying an electrostatic power between said fixed electrodes and said movable electrode to set said movable electrode at a preset reference position according to the output signal of said capacitance-difference detector; and a fixed capacitor having a capacitance value which is larger than the maximum capacitance-difference between said variable capacitors of which the capacitance values vary according to an acceleration, said fixed capacitor being connected in parallel with one of said variable capacitors.

2. A capacitor type acceleration sensor according to claim 1, in which said electrostatic power generation/feedback circuit comprises:

a comparator for comparing the integrated value of the output voltage of said capacitance-difference detector with a reference voltage; and a reference voltage adjustor for adjusting the reference voltage to be equal to the integrated value of the voltage that is produced from said capacitance-difference detector when an acceleration is zero.

3. A capacitor type acceleration sensor according to claim 1, in which said electrostatic power generation/feedback circuit comprises a comparator for comparing the integrated value of the output voltage of said capacitance-difference detector circuit with a reference voltage; and a power source for applying a fixed reference voltage to said comparator as the reference voltage.

4. A capacitor type acceleration sensor according to claim 1, further comprising an integrator/adder connected to said electrostatic power generation/feedback circuit for removing the noise components of an output signal from said electrostatic power generation/feedback circuit.

* * * * *